United States Patent
Denkwitz et al.

(10) Patent No.: US 10,000,589 B2
(45) Date of Patent: Jun. 19, 2018

(54) HIGH PERFORMANCE ZIEGLER-NATTA CATALYST SYSTEMS, PROCESS FOR PRODUCING SUCH SUPPORTED CATALYSTS AND USE THEREOF

(71) Applicant: Lummus Novolen Technology GmbH, Mannheim (DE)

(72) Inventors: Yvonne Denkwitz, Mannheim (DE); Oliver Schuster, Weinheim (DE); Andreas Winter, Neuleininger (DE)

(73) Assignee: Lummus Novolen Technology GmbH, Mannheim (DE)

( * ) Notice: Subject to any disclaimer, the term of this patent is extended or adjusted under 35 U.S.C. 154(b) by 0 days. days.

(21) Appl. No.: 15/286,991

(22) Filed: Oct. 6, 2016

(65) Prior Publication Data
US 2017/0022305 A1    Jan. 26, 2017

Related U.S. Application Data

(62) Division of application No. 14/082,561, filed on Nov. 18, 2013, now Pat. No. 9,481,741.

(60) Provisional application No. 61/729,907, filed on Nov. 26, 2012.

(51) Int. Cl.
*C08F 110/06* (2006.01)
*C08F 4/64* (2006.01)
*C08F 10/00* (2006.01)

(52) U.S. Cl.
CPC ............. *C08F 110/06* (2013.01); *C08F 4/64* (2013.01); *C08F 10/00* (2013.01)

(58) Field of Classification Search
None
See application file for complete search history.

(56) References Cited

U.S. PATENT DOCUMENTS

| | | |
|---|---|---|
| 7,232,785 B2 | 6/2007 | Spaether et al. |
| 7,388,061 B2 † | 6/2008 | Gao |
| 7,649,062 B2 | 1/2010 | Matsunaga et al. |
| 2004/0033887 A1 | 2/2004 | Spaether |
| 2004/0229748 A1 | 11/2004 | Chen et al. |
| 2004/0235645 A1 | 11/2004 | Morini et al. |
| 2006/0154806 A1 | 7/2006 | Chen et al. |
| 2009/0326172 A1 † | 12/2009 | Standaert |

FOREIGN PATENT DOCUMENTS

| | | |
|---|---|---|
| JP | 2002-226510 A | 8/2002 |
| WO | 02/100904 A1 † | 12/2002 |

OTHER PUBLICATIONS

Office Action issued in Japanese Application No. 2015-543439; dated Mar. 14, 2017, with English Translation (6 pages).
Office Action issued in Korean Application No. 10-2015-7015931; dated Apr. 28, 2017, with English Translation (5 pages).
Written Opinion dated Sep. 13, 2016 in corresponding Singapore application No. 11201504143T (8 pages).
Examination Report issued in GCC Application No. GC2013-25858; dated Apr. 23, 2017 (5 pages).
Office Action issued in Chinese Application No. 201380068338.4; dated Jun. 21, 2017, with English Translation (7 pages).
Written Opinion issued in Singaporean Application No. 11201504143T; dated Jul. 6, 2017 (6 pages).
Office Action issued in Colombian Application No. 15-119.615 dated Jul. 11, 2017 (27 pages).
Second Office Action dated Dec. 7, 2016 in corresponding Chinese application No. 201380068338.4 (w/translation) (11 pages).
Notice of Rejection dated Oct. 6, 2016 in corresponding Korean application No. 10-2015-7015931 (w/translation) (14 pages).

† cited by third party

*Primary Examiner* — Catherine S Branch
(74) *Attorney, Agent, or Firm* — Osha Liang LLP

(57) ABSTRACT

A method for making a solid catalyst component for use in a Ziegler-Natta catalyst includes combining in a hydrocarbon solvent a porous particulate support with a hydrocarbon soluble organomagnesium compound to form a suspension. The organomagnesium compound is halogenated followed by addition of an alcohol and the mixture is then reacted with a titanium compound followed by a reaction with at least one diether compound to form the solid catalyst component. Afterwards the reaction product is extracted with a mixture of a titanium compound and a hydrocarbon solvent. The solid catalyst component recovered is combined with an aluminum cocatalyst to form a Ziegler-Natta catalyst system for the polymerization of olefins. In particular, the catalyst system including a diether internal electron donor may have an activity and hydrogen response suitable for the production of propylene polymers having a molecular weight distribution (PI(GPC)) in the range from about 5.75 to about 9.

18 Claims, No Drawings

HIGH PERFORMANCE ZIEGLER-NATTA CATALYST SYSTEMS, PROCESS FOR PRODUCING SUCH SUPPORTED CATALYSTS AND USE THEREOF

CROSS-REFERENCE TO RELATED APPLICATIONS

This application, pursuant to 35 U.S.C. § 120, claims benefit to U.S. patent application Ser. No. 14/082,561, filed Nov. 18, 2013, now U.S. Pat. No. 9,481,741, which pursuant to 35 U.S.C. § 119(e), claims priority to U.S. Provisional Application Ser. No. 61/729,907, filed Nov. 26, 2012. Each of these applications is incorporated by reference in its entirety.

FIELD OF THE DISCLOSURE

Embodiments disclosed herein relate generally to an improved Ziegler-Natta catalyst. In particular, embodiments herein relate to the use of such catalyst in the polymerization of olefins to polyolefins, and particularly to an improved method for making a Ziegler-Natta catalyst using diether compounds as internal donor.

BACKGROUND

Ziegler-Natta catalysts are generally composed of a catalyst support material such as $MgCl_2$ and a transition metal component. The transition metal component is typically a substituted Group 4-8 transition metal, with titanium, zirconium, chromium or vanadium being commonly used. The transition metal is often provided as a metal halide, such as $TiCl_4$. Ziegler-Natta catalysts are used to effectively promote the high yield polymerization of olefins. In the polymerization of olefins, the catalyst is often used in combination with an aluminum cocatalyst.

When used to catalyze polymerization of propylene, a third component has to be used in the catalyst. The third component is an electron donor used to control the stereoregularity of the polymer. It can be either incorporated into the catalyst during its synthesis (an internal donor), or it can be added to the polymerization reactor during the polymerization reaction (an external donor). In most polymerizations, both an internal donor and an external donor may be used. Various aromatic esters, diethers, succinates, alkoxysilanes and hindered amines are examples of compounds that have been used as internal donors.

U.S. Pat. Nos. 5,162,465, 5,006,620, 6,524,995 or 6,831,032 disclose the preparation of polymers of propene using a Ziegler-Natta catalyst system consisting of a titanium component which is based on a finely divided, shape-imparting silica gel and contains, in addition to titanium, magnesium, chlorine and a benzenecarboxylic acid or phthalate derivative as internal donor, an aluminum component and a silane component used as external donor.

While a variety of Ziegler-Natta catalysts have been developed, due to the importance of olefin polymerizations, there remains a need to develop catalysts having improved activity. Improving the activity of the catalyst leads to higher product yields and reduces the quantity of the catalyst required for the olefin polymerization reaction, which reduces the catalyst cost and the amount of catalyst impurities in the polymer (reduced ash content), resulting in polymers with a better performance profile.

Due to health, environment and safety concerns in connection with the use of phthalate containing Ziegler-Natta catalysts for the production of polymers with potential skin or food contact, a second driver to develop new Ziegler-Natta catalysts is the need to provide non-phthalate catalyst versions that produce polymers with an identical or at least very similar performance profile as the currently broadly used phthalate containing Ziegler-Natta catalysts.

Well known alternatives to Ziegler-Natta catalysts based on phthalates as internal donors are versions where various malonates, succinates or diether compounds are used. Unfortunately, the use of such alternative internal donors results in polymers with fully different performance profiles. As an example and a direct comparison, the use of a phthalate based Ziegler-Natta catalyst leads to polymers with a GPC Polydispersity Index (PI(GPC)) (also referred to as Molecular Weight Distribution or Mw/Mn) in the range of 6.5 to 8, when using certain diethers as an internal donor the polydispersity is much more narrow (4.5 to 5.5), and when using succinate as internal donor the polydispersity is 10 to 15 (Polypropylene Handbook, $2^{nd}$ Edition, Editor: Nello Pasquini, Carl Hanser Verlag, Munich, 2005, page 18, Table 2.1 and P. Galli, G. Vecellio, Journal of Polymer Science: Part A: Polymer Chemistry, Vol. 42, 396-415 (2004), pages 404-405 and Table 1).

The molecular weight distribution is one of the most important properties of a polymer. By changing this parameter, the crystalline structure and the crystallization rate of a polymer is dramatically influenced, which has impact on the convertibility and usability of a certain polymer for a certain application. As an example, for extrusion applications like sheet, pipe, film, raffia, or thermoforming, a broader molecular weight distribution is advantageous, while for applications like fiber or injection molding a narrower molecular weight distribution would be advantageous. As used to processing polymers produced using phthalate based Ziegler-Natta catalysts, the converters insist in molecular weight distributions typically produced by such catalysts and expect that phthalate free Ziegler-Natta catalysts deliver a similar molecular weight distribution. Unfortunately, state of the art diether based catalysts deliver polymers where the molecular weight distribution is too narrow while succinate based catalysts deliver polymers where the molecular weight distribution is far too broad.

SUMMARY OF THE DISCLOSURE

Embodiments disclosed herein provide a non-phthalate Ziegler-Natta catalyst system for the polymerization and copolymerization of olefins that overcome the above shortcomings in the prior art and provide a Ziegler-Natta catalyst system with a unique selection, combination, and treatment of the three essential components of a Ziegler-Natta catalyst, the support, the transition metal component and the internal donor, as described below. The resulting Ziegler-Natta catalyst has unusually high activity, excellent hydrogen response and stereoselectivity, while the molecular weight distribution is comparable to phthalate containing Ziegler-Natta catalysts.

In one aspect, embodiments disclosed herein relate to a method for making a solid catalyst component for use in a Ziegler-Natta catalyst system. The method may include the steps of: (a) combining a porous particulate support in an inert solvent with a hydrocarbon soluble organomagnesium compound to form a slurry mixture; (b) halogenating the organomagnesium compound; (c) reacting the slurry mixture with a titanium compound, followed by reacting the slurry mixture with at least one diether compound (internal donor); (d) extracting the solid intermediate with a mixture of a titanium compound and a hydrocarbon solvent to form the solid catalyst component; and (e) recovering the solid catalyst component. The solid catalyst component can be combined with an aluminum cocatalyst and an external donor to provide a Ziegler-Natta catalyst useful for the polymerization of olefins.

Other aspects and advantages will be apparent from the following description and the appended claims.

DETAILED DESCRIPTION

In one aspect, embodiments disclosed herein relate to Ziegler-Natta catalysts useful for the polymerization of olefins. The Ziegler-Natta catalyst system provided herein includes an aluminum compound, a solid catalyst component and preferably an external electron donor. The solid catalyst component includes a titanium compound, a magnesium component containing at least one halogen, a porous particulate support, and at least one diether compound. The magnesium component of the solid catalytic component is provided from a hydrocarbon soluble organomagnesium source.

In the preparation of the catalytic systems according to embodiments herein, a particulate porous support is used. The support may be any type of support commonly used in Ziegler-Natta type catalysts which is compatible with the polymerization of alk-1-enes. The support must have the ability to chemically, physically or mechanically bind the halogenated magnesium compound.

It is preferred to use porous supports having a specific surface area in the range from about 10 to about 1000 $m^2/g$, preferably of from about 50 to about 700 $m^2/g$, and more preferably from about 100 $m^2/g$ to about 600 $m^2/g$, wherein the specific surface area is determined in accordance with DIN 66131. The catalyst support has a mean particle diameter in the range of from about 5 to about 200 μm, preferably from about 10 to about 100 μm, and more preferably from about 15 to about 70 μm. Mean particle diameter herein refers to the volume average mean (median value) of the particle size distribution as determined by Malvern Mastersizer Analysis in accordance with ASTM Standard D 4464-00.

The particulate inorganic metal-oxygen compounds used in the preparation of the solid catalytic component of the catalytic systems described herein may be of a granular (irregular) or spray-dried (semi-spherical, micro-spheroidal) nature. Also useful is fumed silica, which can be treated in a subsequent wet-chemical treatment to build up larger particle aggregates. Other particulate oxides derived from known particle forming processes can also be used.

Inorganic metal-oxygen compounds useful in embodiments herein include oxides of silicon, aluminum, titanium, zirconium, metals from Groups I or II of the Periodic Table, or mixtures or chemical combinations of these oxides. Examples of preferred metal-oxygen compounds include aluminum oxide, silicon oxide, titanium oxide, zirconium oxide, aluminum phosphate, magnesium oxide or layered silicates. Particularly preferred is the use of silicon oxide (silica gel). Also, mixed oxides such as aluminum silicates, or magnesium silicates, may be used.

The particulate inorganic metal-oxygen compounds used as a support in the catalytic component in general have pore volumes of from about 0.1 $cm^3/g$ to about 10 $cm^3/g$, preferably from about 1.0 $cm^3/g$ to about 4.0 $cm^3/g$, these values being determined by mercury intrusion porosimetry in accordance with DIN 66133 and nitrogen adsorption in accordance with DIN 66131.

The pH value (i.e., the negative logarithm of the protonic concentration) of the particulate inorganic metal-oxygen compounds used in the preparation of the solid catalytic component of the catalytic systems described herein may vary depending on the production process used. Preferably, the PH value is in the range of from about 3.0 to about 9.0, and more preferably from about 5.0 to about 7.0. The pH value is determined by using the method described in S. R. Morrison, The Chemical Physics of Surfaces, Plenum Press, New York [1977], pages 130 ff.

Inorganic metal-oxygen compounds often contain hydroxyl groups on the surfaces and residual water in the pores. By cleavage of water or condensation of Si—OH groups respectively, the hydroxyl group content may be reduced or even removed completely. This can be carried out by means of a thermal or chemical treatment. In general, a thermal treatment includes heating the metal-oxygen compound at a temperature of from about 150° C. to about 900° C. preferably from about 600° C. to about 800° C. for about 1 to about 24 hours, preferably for about 2 to about 20 hours, and more preferably for about 3 to about 12 hours. Removal of the hydroxyl groups by chemical means may be carried out by treating the material with usual drying agents such as, for example $SiCl_4$, chlorosilanes and aluminum alkyls. Preferably, the inorganic oxides used contain normally from about 0.1% to about 5% by weight physically adsorbed water in addition to the water bonded in hydroxylic form. Usually the water content is determined by drying the inorganic oxide until constant weight at 160° C. and normal pressure. The loss of weight corresponds with the initial physically adsorbed water content.

Spray dried silica grades, which inherently exhibit meso and macro pores, cavities and channels are preferred over granular silica grades.

In the preparation of the solid catalytic component, the particulate porous catalyst support is impregnated with at least one hydrocarbon soluble organomagnesium compound, as described below. Herein the term "hydrocarbon soluble" means that the organomagnesium compound dissolves in an amount of at least about 5% by weight at ambient temperature in an aliphatic or aromatic hydrocarbon solvent. Typical aliphatic or aromatic hydrocarbon solvents are C5-C20 hydrocarbons or mixtures of hydrocarbons such as pentane, hexane, heptane, toluene or ethylbenzene and the like.

The organomagnesium compound can be halogen-free, or alternatively can contain a halogen, such as, e.g., Grignard compounds. If a halogen-free organomagnesium compound is used, during the further course of the preparation of the solid catalytic component the halogen-free organomagnesium compound is converted into a compound of magnesium containing at least one halogen by using known halogenation means (e.g., by contacting with a halogenating agent such as HCl gas). Herein, the term "halogen" refers to chlorine, bromine, iodine or fluorine or mixtures of two or more halogens. Preferably, the compound of magnesium containing at least one halogen contains chlorine or bromine, and most preferably, chlorine.

Examples of suitable organomagnesium compounds include dialkyl, diaryl and alkylarylmagnesium compounds, magnesiumalkoxy or magnesiumaryloxy compounds or Grignard compounds.

Examples of suitable halogen-free organomagnesium compounds include di-n-propylmagnesium, di-isopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, and diphenylmagnesium. Among these, n-butylethylmagnesium and n-butyloctylmagnesium are preferred. Examples of halogen-containing organomagnesium Grignard compounds include n-butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, hexylmagnesium chloride, octylmagnesium chloride, phenylmagnesium chloride, and phenylmagnesium bromide.

Particularly preferred organomagnesium compounds in the preparation of the solid catalytic component are magnesium di-(C2-C10-alkyl) compounds.

Suitable halogenating agents include halogens in their elemental state, hydrogen halogenides (e.g., HCl, HBr, HI), $SiCl_4$ or $CCl_4$. Especially preferred are chlorine or hydrogen chloride.

The solid catalytic component further comprises a titanium compound. Titanium compounds useful in preparing the solid catalyst component include the halogenides of tri- or tetravalent titanium. Titanium alkoxy halogenide compounds and mixtures of two or more titanium compounds are also contemplated. Preferred titanium compounds include those wherein the halogen is chlorine and in particular titanium tetrachloride is preferred.

Suitable diether internal donor compounds useful in embodiments herein may be represented by the general structure (I):

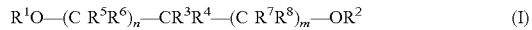

$$R^1O-(C\ R^5R^6)_n-CR^3R^4-(C\ R^7R^8)_m-OR^2 \qquad (I)$$

wherein $R^1$ and $R^2$ are the same or different and are selected from the group consisting of a saturated or unsaturated aliphatic group of from 1 to about 20 carbon atoms or an aryl group of from 6 to about 20 carbon atoms,
n+m=2 to 4,
$R^3$, $R^4$, $R^5$, $R^6$, $R^7$ and $R^8$ are identical or different and are each a hydrogen atom, a linear, cyclic or branched hydrocarbon group, for example an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms or an arylalkenyl group of from 8 to about 40 carbon atoms and may contain one or more hetero atoms like Si, B, Al, O, S, N or P, and/or may contain halogen atoms like F, Cl or Br, and/or the two radicals $R^3$ and $R^4$ may form a hydrocarbon ring system. $R^3$ and/or $R^4$ are different from hydrogen.

Preferred diether internal donor compounds useful in embodiments herein may be 1,3-diether compounds represented by the structure (II):

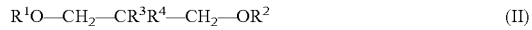

$$R^1O-CH_2-CR^3R^4-CH_2-OR^2 \qquad (II)$$

wherein $R^1$ and $R^2$ are the same or different and are selected from the group consisting of a saturated or unsaturated aliphatic group of from 1 to about 20 carbon atoms, more preferably an alkyl group of from 1 to about 10 carbon atoms, even more preferably an alkyl group of from 1 to 4 carbon atoms, ideally a methyl or ethyl group, most ideally a methyl group, $R^3$ and $R^4$ are identical or different and are each a linear, cyclic or branched hydrocarbon group, for example an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms or an arylalkenyl group of from 8 to about 40 carbon atoms and may contain one or more hetero atoms like Si, B, Al, O, S, N or P, and/or may contain halogen atoms like F, Cl or Br, and/or the two radicals $R^3$ and $R^4$ may form a hydrocarbon ring system.

More preferably, diether internal donor compounds useful in embodiments herein may be 1,3-diether compounds represented by the structure (III):

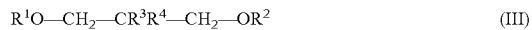

$$R^1O-CH_2-CR^3R^4-CH_2-OR^2 \qquad (III)$$

wherein $R^1$ and $R^2$ are identical and are selected from the group consisting of an alkyl group of from 1 to about 10 carbon atoms, even more preferably an alkyl group of from 1 to 4 carbon atoms, ideally a methyl or ethyl group, most ideally a methyl group, $R^3$ and $R^4$ are identical or different and are each a linear, cyclic or branched hydrocarbon group, for example an alkyl group of from 1 to about 10 carbon atoms, an alkenyl group of from 2 to about 10 carbon atoms, an aryl group of from 6 to about 10 carbon atoms, an arylalkyl group of from 7 to about 40 carbon atoms, an alkylaryl group of from 7 to about 40 carbon atoms or an arylalkenyl group of from 8 to about 40 carbon atoms, and/or the two radicals $R^3$ and $R^4$ may form a hydrocarbon ring system, which may contain one or more hetero atoms like Si, O, S, N or P.

Examples of preferred diether electron donor compounds include 2,2 di-cyclopentyl-1,3-dimethoxypropane; 2,2 di-(cyclopentylmethyl)-1,3-dimethoxypropane; 2,2-di-cylohexyl-1,3-dimethoxypropane; 2,2-di-(cylohexylmethyl)-1,3-dimethoxypropane; 2,2-di-norbomnyl-1,3-dimethoxypropane; 2,2-di-phenyl-1,3-dimethoxypropane; 2,2-di-phenylmethyl-1,3-dimethoxypropane; 2,2-di-n-propyl-1,3-dimethoxypropane; 2,2-di-isopropyl-1,3-dimethoxypropane; 2,2-di-n-butyl-1,3-dimethoxypropane; 2,2-di-secbutyl-1,3-dimethoxypropane; 2,2-di-isobutyl-1,3-dimethoxypropane; 2,2-di-n-pentyl-1,3-dimethoxypropane; 2,2-di-(2-pentyl)-1,3-dimethoxypropane; 2,2-di-(3-pentyl)-1,3-dimethoxypropane; 2,2-di-(methylbutyl)-1,3-dimethoxypropane; 2,2-di-(3-methylbut-2-yl)-1,3-dimethoxypropane; 2,2-di-isopentyl-1,3-dimethoxypropane; 2,2-di-n-hexyl-1,3-dimethoxypropane; 2,2-di-2-hexyl-1,3-dimedioxypropane; 2,2-di-3-hexyl-1,3-dimethoxypropane; 2,2-di-(2-methylpentyl)-1,3-dimethoxypropane; 2,2-di-(3-methylpentyl)-1,3-dimethoxypropmne; 2,2-di-(4-methylpentyl)-1,3-dimethoxypropane; 2-tertbutyl-1,3-dimethoxypropane; 2-ethyl-2-tertbutyl-1,3-dimethoxypropane; 2-n-propyl-2-tertbutyl-1,3-dimethoxypropane; 2-n-butyl-2-tertbutyl-1,3-dimethoxypropane; 2-isobutyl-2-tertbutyl-1,3-dimethoxypropane; 2-n-pentyl-2-tertbutyl-1,3-dimethoxypropane; 2-isopentyl-2-tertbutyl-1,3-dimethoxypropane; 2-n-hexyl-2-tertbutyl-1,3-dimethoxypropane; 2-ethyl-2-isopropyl-1,3-dimethoxypropane; 2-n-propyl-2-isopropyl-1,3-dimethoxypropane; 2-n-butyl-2-isopropyl-1,3-dimetboxypropane; 2-secbutyl-2-isopropyl-1,3-dimiethoxypropane; 2-isobutyl-2-isopropyl-1,3-dimethoxypropane; 2-n-pentyl-2-isopropyl-1,3-dimethoxypropane; 2-(2-pentyl)-2-isopropyl-1,3-dimethoxypropane; 2-(3-pentyl)-2-isopropyl-1,3-dimethoxypropane; 2-methylbutyl-2-isopropyl-1,3-dimethoxypropane; 2-(3-methyl but-2-yl)-2-isopropyl-1,3-dimethoxypropane; 2-isopentyl-2-isopropyl-1,3-dimethoxypropane; 2-n-hexyl-2-isopropyl-1,3-dimethoxypropane; 2-(2-hexyl)-2-isopropyl-1,3-dimethoxypropane; 2-(3-hexyl)-2-isopropyl-1,3-dimethoxypropane; 2-(2-methylpentyl)-2-isopropyl-1,3-dimethoxypropane; 2-(3-methylpentyl)-2-isopropyl-1,3-dimetihoxypropane; 2-(4-methylpentyl)-2-isopropyl-1,3-dimethoxypropane; 2-ethyl-2-cyclopentyl-1,3- dimethoxypropane; 2-n-propyl-2-cyclopentyl-1,3-dimethoxypropane; 2-isopropyl-2-cyclopentyl-1,3-dimethoxypropane; 2-n-butyl-2-cyclopentyl-1,3-dimethoxypropane; 2-isobutyl-2-cyclopentyl-1,3-dimethoxypropane; 2-secbutyl-2-cyclopentyl-1,3-dimethoxypropane; 2-n-pentyl-2-cyclopentyl-1,3-dimethoxypropane; 2-(2-pentyl)-2-cyclopentyl-1,3-dimethoxypropane; 2-(3-pentyl)-2-cyclopentyl-1,3-dimethoxypropane; 2-methylbutyl-2-cyclopentyl-1,3-dimethoxypropane; 2-(3-methylbut-2-yl)-2-cyclopentyl-1,3-dimethoxypropane; 2-ethyl-2-cyclohexyl-1,3-dimethoxypropane; 2-n-propyl-2-cyclohexyl-1,3-dimethoxypropane; 2-isopropyl-2-cyclohexyl-1,3-dimethoxypropane; 2-n-butyl-2-cyclohexyl-1,3-dimnethoxypropane; 2-isobutyl-2-cyclohexyl-1,3-dimethoxypropane; 2-secbutyl-2-cyclohexyl-1,3-dimethoxypropane; 2-n-pentyl-2-cyclohexyl-1,3-dimethoxypropane; 2-(2-pentyl)-2-cyclohexyl-1,3-dimethoxypropane; 2-(3-pentyl)-2-cyclohexyl-1,3-dimethoxypropane; 2-methylbutyl-2-cyclohexyl-1,3-dimethoxypropane; 2-(3-methylbut-2-yl)-2-cyclohexyl-1,3-dimethoxypropane; and the corresponding 1,3-diethoxypropane analogues.

A further group of suitable diether internal donor compounds include: 9,9-bis(methoxymethyl)fluorene; 9,9-bis(mecthoxymethyl)-2,3,6,7-tetamethylfluorene; 9,9-bis(methoxymcthyl)-2,7-dimethylfluorene; 9,9-bis(miethoxymethyl)-2,7-diisoproylfluorene; 9,9-bis(metboxymethyl)-2,7-ditertbutylfluorene; 9,9-bis(methoxymethyl)-2,8-dimethylfluorene; 9,9-bis(methoxymethyl)-3,6-dimtethylfluorene; 9,9-bis(methoxymethyl)-3,6-ditertbutylfluorene; 9,9-bis(methoxymiethyl)-3,6-diisopropylfluorene; 9,9-bis(methoxymethyl)-4,5-dimecthylfluorene; 9,9-bis(methoxymethyl)-2-methylfluorene; 9,9-bis(methoxymethyl)-4-methyifluorene; 9,10-dihydro-9,9-dimnethoxyanthracene; 9,10-dihydro-9,9-diethoxyanthracene; 9,9-Dimethoxyxanthene; 9,9-Diethoxyxanthene; and the corresponding 9,9-bis(ethoxymethyl)-ananalogues.

Preferably, the diether electron donor is a compound, such as 2,2-di-isobutyl-1,3-dimethoxypropane; 2,2-di-isopropyl-1,3-dimethoxypropane; 2,2-di-cyclopentyl-1,3-dimethoxypropane; 2-isopropyl-2-isopentyl-1,3-dimethoxypropane; 2-isopropyl-2-isobutyl-1,3-dimethoxypropane; 2-isopropyl-2-cyclopentyl-dimethoxypropane; 2-ethyl-2-tert-butyl-1,3-dimethoxypropane or the corresponding 1,3-diethoxypropane analogues or 9,9-bis(methoxymethyl)fluorene or 9,9-bis(ethoxymethyl)fluorene.

Also, mixtures of two or more diether internal electron donor compounds may be used in the preparation of the solid catalytic component according to embodiments herein.

When used in the preparation of the particulate solid component, the diether donor compound may be used in an amount of from about 0.01 to about 2 mole, preferably from about 0.05 to about 0.9 mole, more preferably from about 0.1 to about 0.6 mole for each mole of the magnesium halide compound.

The Catalytic System

The catalytic systems described herein, in addition to the solid catalytic component, further include at least one aluminum compound as co-catalyst. In addition to the aluminum compound(s) the catalytic systems described herein preferably include at least one external electron donor compound.

Examples of suitable aluminum compounds include aluminum trialkyls and derivatives thereof wherein an alkyl group is substituted by an alkoxy group or a halogen atom, e.g., chlorine or bromine atom. The alkyl groups may be the same or different. The alkyl groups may be linear or branched chain alkyl groups. Preferred trialkylaluminum compounds are those wherein the alkyl groups each have 1 to 8 carbon atoms, such as trimethylaluminum, triethylaluminum, tri-isobutylaluminum, trioctylaluminum or methyldiethylaluminum.

Examples of external electron donor compounds that may be used in the catalytic systems herein include mono- and poly-functional carboxylic acids, carboxylic anhydrides and carboxylic esters, ketones, ethers, alcohols, lactones, as well as organic phosphorus and silicon compounds. Also, a mixture of two or more external electron donor compounds may be used. The external electron donor compound and the internal electron donor compound used in the preparation of the solid catalyst component may be the same or different. Preferred external electron donor compounds are organo-silicon compounds of general formula (IV)

wherein each of the $R^9$ radicals which may be the same or different, represent C1-C20 alkyl groups, 5- to 7-membered cyclic alkyl groups optionally substituted with C1-C10 alkyl, C6-C18 aryl groups or C6-C18 arylalkyl or alkylaryl groups and the $R^{10}$ radicals may be the same or different and are C1-C20 alkyl groups and n is the integer 1, 2 or 3.

Preferred compounds of formula (IV) are diisopropyldimethoxysilane, dimethyldimethoxysilane, tetramethoxysilane, tetraethoxysilane, di(tert-butyl)dimethoxysilane, isobutyl(isopropyl)dimethoxysilane, diisobutyldimethoxysilane, dicyclopentyldimethoxysilane, cyclohexyl(methyl)dimethoxysilane, dicyclohexyldimethoxysilane, isopropyl(tert-butyl)dimethoxysilane, isopropyl(sec-butyl)dimethoxysilane, isobutyl(sec-butyl)dimethoxysilane, bicyclo[2.2.1]heptan-2-yl dimethoxy-(methyl)silane, bicyclo[2.2.1]heptan-2-yl trimethoxysilane, and di(bicyclo[2.2.1]heptan-2-yl)dimethoxysilane.

Preparation of the Solid Catalytic Compound

The solid catalytic components of the catalyst systems described herein may be produced by applying the following steps:

a) a particulate porous support, e.g., an inorganic oxide such as silica, is suspended in an inert solvent, preferably a liquid alkane or aromatic hydrocarbon solvent, (such as heptane, toluene or ethylbenzene) and the slurry formed is treated with a solution of the hydrocarbon soluble organomagnesium compound such as dialkylmagnesium (i.e., in a hydrocarbon solvent such as heptane), and then the mixture formed is reacted at a temperature of from about 10° C. to about 120° C. for from about 0.5 to about 5 hours, typically with stirring.

b) a halogenating agent, preferably chlorine or hydrogen chloride, is added in at least a two-fold molar excess, preferably at least a five-fold molar excess, based on the organomagnesium compound, under stirring and allowed to react for about 0.5 to about 3 hours followed by the addition of 1 to 5 moles, preferably of about 1.6 to 4 moles, more preferably of about 1.5 to 3.5 moles of a C1-C8 alkanol like ethanol for each mole of the organomagnesium compound at a temperature between about −20° C. and 150° C. and preferably reacted for a period of 0.5-1 hour.

c) a titanium compound such as titanium tetrachloride and after about 0.1-0.5 hours the diether internal electron donor compound or a mixture of at least two diether internal donor compounds, are added. The titanium compound is used in an amount of 1 to 15 moles, preferably 2 to 10 moles for each mole of the magnesium compound and the diether internal electron donor compound or the mixture of at least two diether internal donor compounds is added in an amount of 0.01 to 1 mole, preferably 0.1 to 0.6 mole for each mole of the magnesium compound. The resulting mixture is allowed to react, generally under stirring, for from 0.5 to 3 hours at a temperature in the range of from about 10° C. to 150° C. preferably from about 60° C. to 140° C. The resulting solid product is then recovered by filtration and washed with a C1-C10 alkyl or alkylaryl solvent, preferably with heptene or ethylbenzene.

d) the resulting solid product is extracted with an excess of a solution of titanium tetrachloride in an inert solvent, preferably a C7-C10 alkylbenzene like toluol, xylol or ethylbenzene, containing at least about 5% by weight of titanium tetrachloride. In general, the extraction is continued for at least about 30 minutes, preferably from 1 to 5 hours, most preferred from 1.5 to 4 hours.

e) filtering and washing several times with a hydrocarbon, like pentane, hexane or heptane, and then drying under vacuum and/or elevated temperature of 30-100° C., preferably 40-90° C., most preferably 50-80° C.

The solid catalytic component preferably has a molar ratio of the inorganic oxide to the compound of titanium in the range of from about 1000 to 1, more preferably from about 100 to 2, and most preferably from about 50 to 2.

The solid catalytic component is most preferably produced by applying the following steps:

a) a particulate porous silica support is suspended in a mixture of heptane and ethylbenzene and the slurry formed is treated with a solution of dialkylmagnesium in heptane, and then the mixture formed is reacted at a temperature of from about 10° C. to about 120° C. for from about 0.5 to about 1 hours with stirring.

b) hydrogen chloride, is added in at least a two-fold molar excess, preferably at least a five-fold molar excess, based on the dialkylmagnesium compound, under stirring and allowed to react for about 0.5 to about 2.5 hours followed by the addition of about 1.5 to 3.5 moles of a C1-C8 alkanol like ethanol for each mole of the dialkylmagnesium compound at a temperature between about 10° C. and 100° C. and reacted for a period of 0.5-1 hour.

c) titanium tetrachloride and after about 0.1-0.5 hours the diether internal electron donor compound or a mixture of at least two diether internal donor compounds, are added. The titanium tetrachloride is used in an amount of 2 to 10 moles for each mole of the magnesium compound and the diether internal electron donor compound or the mixture of at least two diether internal donor compounds is added in an amount of 0.1 to 0.6 mole for each mole of the magnesium compound. The resulting mixture is allowed to react, generally under stirring, for from 0.5 to 3 hours at a temperature in the range of from about 60° C. to 140° C. The resulting solid product is then recovered by filtration and washed with ethylbenzene.

d) The resulting solid product is extracted with an excess of a solution of titanium tetrachloride in xylol or ethylbenzene, containing at least about 5% by weight of titanium tetrachloride. In general, the extraction is continued for from 1.5 to 4 hours.

e) Filtering and washing several times with a hydrocarbon, like pentane, hexane or heptane, and then drying under vacuum and/or elevated temperature of 50-80° C.

The solid catalytic component has a molar ratio of the particulate porous silica support to the titanium tetrachloride in the range of from about 50 to 2.

Preparation of the Catalytic System

To prepare the catalytic systems described herein, the aluminum compound as co-catalyst and/or the external electron donor compound may be contacted with the solid catalytic component separately in any order or mixed together, normally at a temperature in the range of from about 0° C. to 200° C., preferably from about 20° C. to about 90° C. and a pressure of from about 1 to about 100 bar, in particular from about 1 to about 40 bar.

Preferably, the aluminum compound co-catalyst is added in such an amount that the atomic ratio of the aluminum compound to the transition metal of the solid catalytic component is from about 10:1 to about 800:1, in particular from about 20:1 to about 200:1.

Polymerization

The catalytic systems described herein may be advantageously used in the polymerization of alk-1-enes. Suitable alk-1-enes include linear or branched C2-C10 alkenes, in particular linear C2-C10 alk-1-enes such as ethylene, propylene, but-1-ene, pent-1-ene, hex-1-ene, hept-1-ene, oct-1-ene non-1-ene, dec-1-ene or 4-methylpent-1-ene. Mixtures of these alk-1-enes may be polymerized as well.

The catalytic systems described herein, including the solid catalytic component and as co-catalyst an aluminum compound or an aluminum compound and preferably an external electron donor compound, are excellent catalytic systems for use in the production of propylene polymers, both homo polymers of propylene as well as co-polymers of propylene and one or more further alk-1-enes having up to 10 carbon atoms. The term co-polymers as used herein also refers to co-polymers wherein the further alk-1-ene having up to 10 carbon atoms is incorporated randomly. In these co-polymers in general the co-monomer content is less than about 15% by weight. The copolymers may also be in the form of so-called block or impact copolymers, which in general comprise at least a matrix of a propylene homo polymer or propylene random co-polymer containing less than 15% by weight of a further alk-1-ene having up to 10 carbon atoms and a soft phase of a propylene co-polymer (rubber phase) containing 15% to 80% by weight of further alk-1-enes having up to 10 carbon atoms. Also, mixtures of co-monomers are contemplated, resulting in, for example, ter-polymers of propylene.

The production of propylene polymers may be carried out in any common reactor suitable for the polymerization of alk-1-enes, either batchwise or, preferably, continuously, i.e., in solution, as suspension polymerization including the bulk polymerization in liquid monomer, or as gas phase polymerization. Examples of suitable reactors include continuously stirred reactors, loop reactors, fluid bed reactors, and horizontal or vertical stirred powder bed reactors. It will be understood that the polymerization may be carried out in a series of consecutively coupled reactors. The reaction time depends on the chosen reaction conditions. In general, the reaction time is from about 0.2 to about 20 hours, usually from about 0.5 to about 10 hours most preferably between 0.5 and 2 hours.

In general, the polymerization is carried out at a temperature in the range of from about 20° C. to about 150° C., preferably from about 50° C. to about 120° C., and more preferably from about 60° C. to about 95° C., and a pressure in the range of from about 1 to 100 bar, preferably from about 15 to about 50 bar, and more preferably from about 20 to about 45 bar.

The molecular weight of the resulting polymers may be controlled and adjusted over a wide range by adding polymer chain transfer or termination agents as commonly used in the art of polymerization, such as hydrogen. In addition an inert solvent, such as toluene or hexane, or an inert gas, such as nitrogen or argon, and smaller amounts of a powdered polymer, e.g., polypropylene powder, may be added.

The weight average molecular weights of the propylene polymers produced by using the catalytic systems described herein in general are in the range of from about 10,000 to 2,000,000 g/mole and the melt flow rates are in the range of from about 0.01 to 2000 g/10 min, preferably from about 0.1 to 100 g/10 min. The melt flow rate corresponds to the amount which is pressed within 10 minutes from a test instrument in accordance with ISO 1133 at a temperature of 230° C. and under a load of 2.16 kg. Certain applications might require different molecular weights than mentioned above and are contemplated to be included within the scope of embodiments herein.

The catalytic systems described herein enable polymerization of alk-1-enes producing polymers having a good morphology and a high bulk density when compared with the prior art catalytic systems. In addition, the catalytic systems may show a dramatic increase of productivity.

Catalyst systems using diether internal donors according to embodiments herein may be used to produce propylene polymers having a molecular weight distribution greater than the molecular weight distribution achieved by prior art catalysts including diethers as an internal donor. For example, catalysts described herein may be used to produce a propylene polymer having a molecular weight distribution (PI(GPC)) of greater than about 5.75 in some embodiments; greater than 6 in other embodiments; greater than 6.25 or 6.5 in yet other embodiments; in the range from about 5.75 to about 9.5 in some embodiments; in the range from about 6 to about 9 in other embodiments; and in the range from about 6.5 to about 8 in yet other embodiments.

Molecular weight properties, like the molecular weight distribution (PI(GPC)), can be measured at 145° C. using an Alliance/GPCV2000 instrument equipped with a refractometer and a triple capillary on-line viscometer (Waters Corporation), having a combination of three mixed-bed columns (Agilent/Polymer Labs PLgel 10 µm Mixed-B) and a guard column (Agilent/Polymer Labs PL gel 10 µm). Polymer solutions with concentration of 1.7 mg/ml are prepared in 1,2-dichlorobenzene (stabilized with 800 ppm 2,6-di-tert-butyl-4-methylphenol) by heating the polymer samples for two hours at 160° C. The injection volume is 300 µl, and the solvent flow rate is 0.5 ml/min. The instrument is calibrated using ten polystyrene standard materials (ReadyCal Kit by PSS). Data acquisition and processing is done using the Waters Millenium software and the Universal Calibration curve.

Due to their good mechanical properties the polymers obtainable by using the catalytic systems disclosed herein, and in particular the propylene homo polymers or the co-polymers of propylene with one or more further alk-1-enes having up to 10 C-atoms, can be used advantageously for the production of films, fibers or moldings and in particular for the production of films.

EXAMPLES

Catalyst Synthesis

Several samples of solid catalytic components (catalysts) of the present invention were produced and tested. The following description of exemplary embodiments is not intended to limit the scope of the invention in any way.

The catalytic components were made using spheroidal silica gel ($SiO_2$) having a particle diameter (d50) of sixty micron. The silica gel had a specific surface area of 505 $m^2/g$, a pore volume of 1.8 $cm^3/g$, a pH of 5.5 and a water content of 2.1% by weight. Silica gel was admixed with a solution of n-butylethylmagnesium in a mixture of n-heptane and ethylbenzene (heptane content: 33%), using 0.5 mol of the magnesium compound per mole of SiO2. The mixture was stirred for 30 minutes at 95° C., then cooled to 20° C., after which 10 times the molar amount, based on the organomagnesium compound, of hydrogen chloride was passed in. After 90 minutes, the reaction product was admixed with 2.5 mole of ethanol per mole of magnesium while stirring continually. This mixture was stirred for 0.5 hour at 80° C. and then cooled down. At room temperature titanium tetrachloride was added. The molar ratio of Mg/Ti used is provided for each catalyst. The molar ratio of Mg/Ti is between 1:15 and 1:1, preferably between 1:10 and 1:2.

While the actual quantities of the initial charges vary slightly for each catalyst preparation run, the initial charge was based on using 10 g of $SiO_2$ support, unless noted otherwise. After the TiCl4 addition, the temperature was increased to 55° C. Then the internal donor (ID), e.g. diether or D-i-BP (di-i-butyl phthalate) was added. The molar ratio of the internal donor (ID) to Mg is provided for each catalyst. The molar ratio of ID/Mg is in a range of from about 0.01 to about 1 mole, preferably from about 0.1 to about 0.6 mole.

If not mentioned otherwise, the suspension was directly heated to 105° C. and held there for 1.5 hours. Afterwards the reactor contents were transferred to a Soxhlet extraction device, filtered while still hot and then washed with ethylbenzene. Then the precatalyst was Soxhlet-extracted for approximately 2 hours with a 90/10 volume mixture of ethylbenzene and $TiCl_4$ at the boiling temperature of the mixture. After extraction the catalyst was washed three times with 100 ml heptane and vacuum dried for 2 h, which results in a residual solvent content of less than 2 wt. % for the catalytic components and comparative catalysts.

One or more parameters were varied for each preparation of the catalytic component. The parameters used and any change from the procedure are noted as follows:

Catalytic Component 1:

The molar ratio of Mg/Ti was 1:6. As internal donor 2-isopropyl-2-isopentyl-dimethoxypropane with an ID/Mg ratio of 0.55 was added.

Catalytic Component 2:

The molar ratio of Mg/Ti was 1:6. As internal donor 2,2-diisobutyl-dimethoxypropane with an ID/Mg ratio of 0.55 was added.

Catalytic Component 3:

The molar ratio of Mg/Ti was 1:6. As internal donor 9,9-Bis(methoxymethyl)fluorene with an ID/Mg ratio of 0.55 was added.

Catalytic Component 4:

The molar ratio of Mg/Ti was 1:12, while 5 g of SiO2 was added. As internal donor 9,9-Bis(methoxymethyl)fluorene with an ID/Mg ratio of 0.33 was added.

Synthesis of Non-Inventive Catalysts Using Phthalate as Internal Donor (ID)

Comparative Catalyst A:

The molar ratio of Mg/Ti was 1:6. As internal donor di-iso-butyl-phthalate with an ID/Mg ratio of 0.45 was added.

Comparative Catalyst B:

The molar ratio of Mg/Ti was 1:6. As internal donor di-iso-butyl-phthalate with an ID/Mg ratio of 0.55 was added.

The titanium, magnesium and silicon content by weight percentage of the catalytic components are summarized in Table 1. The comparative examples are found at the bottom of the table.

TABLE 1

Ti, Mg AND Si - CONTENT OF CATALYTIC COMPONENTS

| Catalytic Component | Ti [wt. %] | Mg [wt. %] | Si [wt. %] |
|---|---|---|---|
| 1 | 4.5 | 8.4 | 17.8 |
| 2 | 4.8 | 8.6 | 17.9 |
| 3 | 4.4 | 8.4 | 17.6 |
| 4 | 5.4 | 8.2 | 17.6 |
| Comp. catalyst A | 4.3 | 8.2 | 18.2 |
| Comp. catalyst B | 6.6 | 6.5 | 14.1 |

Polymerization Testing

The performance of the catalytic components and the catalyst systems in comparison with the comparative phthalate-based catalysts was tested under both bulk polymerization and gas phase polymerization conditions.

If not mentioned otherwise, bulk polymerization testing was performed using a 5-liter reactor equipped with a helical stirrer, 1800 grams of propylene, optionally 2.0 ml external electron donor compound, 9.0 ml of 1.3 M triethylaluminum (TEAl), and 0.5 grams of hydrogen, which were added to the reactor at 25° C. in the following order: after addition of hydrogen, TEAl and optionally silane were premixed and then flushed into the reactor using 900 grams of propylene. The last component added were the approximately 0.01 grams of catalyst using the remaining 900 grams of propylene. Under constant stirring at 200 rpm, the reactor was then heated quickly to 70° C., usually within 10 minutes, and the polymerization run allowed to proceed for 1 hour in liquid propylene as suspension medium.

The same bench scale reactor which was used for the bulk polymerizations was used for the gas phase polymerizations. If not mentioned otherwise, under gas phase conditions the order of addition was the same, but the propylene charges are reduced in size to approximately 180 grams, while 2.5 ml TEAl, optionally an external donor compound and 0.1 g hydrogen were added. The catalyst was injected at 40° C. and the reactor programmed to heat to 75° C. over 10 minutes. Gas phase conditions were maintained by controlling the introduction of the propylene into the system. As the system was heated up to final temperature, the propylene was added at a rate to ensure that the pressure in the reactor vessel is such that the propylene always remains in the gas phase. To insure gas phase conditions, the reactor pressure was maintained at 26.7 bar at 75° C. with gaseous propylene being added through a mass flow meter upon demand.

As external donor compound cyclohexyl-(methyl)-dimethoxysilane was used; below indicated by C. For the polymerization the external donor was diluted with heptane, obtaining a 0.1 M solution.

The physical characteristics of the polypropylene polymers produced using the various catalytic components and/or catalyst systems were determined using the tests described below.

Activity.

The activity results reported throughout this study are based upon polymer yield in kilograms divided by the weight of the catalytic component charged to the reactor in grams for a 1-hour polymerization.

Xylene Solubles (wt % XS).

Xylene solubles were measured using Viscotek's Flow Injector Polymer Analysis (FIPA) technique which is well known in the industry. Viscotek has published an article entitled, "*FIPA for xylene soluble determination of polypropylene and impact copolymers*" (which may be ordered from the Viscotek website, http://www.viscotek.com/applications.aspx) showing that the Viscotek FIPA method exhibits a 0.994 $r^2$ correlation with ASTM Method D5492-06 (equivalent to ISO 16152) over the range of 0.3% to 20% Xylene solubles. Therefore, one of ordinary skill in the art could reproduce the inventive results using either the Viscotek FIPA method or ASTM Method D5492-06. The weight percent of xylene solubles in the polypropylene is an indication of the stereoregulating ability of the catalyst component or catalyst system—the higher the wt % XS, the lower the stereospecificity of the catalyst. While higher XS values are required for applications like the BOPP film production process, low XS values are of value for applications like injection moulding.

Melt Flow Rate (MFR) Measurement.

The melt flow rate effect was measured using ASTM Method D 1238-04. For each 5 gram sample of polymer, 0.2 grams of a standard stabilizing package was added. The additive package consists of 50 wt. % Irganox 1010 and 50 wt. % Irgafos 168. Because the polymer is exposed to air at 230° C. for several minutes during the test, this package is added to inhibit thermal and oxidative degradation of the polymer. The melt flow rate provides information concerning the molecular weight of the polymer and the hydrogen response of the catalyst. The higher the MFR, the higher the hydrogen response rate of the catalyst that produced the polyolefin. Similarly, the higher the MFR, the lower the molecular weight of the polymer.

Molecular Weight Distribution (MWD).

The polydispersity index (PI) can be determined by Gel Permeation Chromatography (GPC) and/or rheological methods using a dynamic shear test, the so called Dynamic Oscillatory Rate Sweep (DORS). It is well known in the art that the PI obtained by DORS is lower than by GPC.

The High Temperature Gel Permeation Chromatograph (GPC-IR, PolymerChar (Valencia, Paterna 46980, Spain)), with IR-4 infrared detector was equipped with three Polymer Laboratories PLgel 10 μm Mixed-BLS columns. The instrument was operated with 1,2 dichlorobenzene @ 150° C. and a flow rate of 1.0 cm<3>/min. The separation efficiency of the column set is calibrated using a series of narrow MWD polystyrene standards reflecting the expected Mw range of the sample being analyzed and the exclusion limits of the column set. 14 individual polystyrene standards, ranging from Peak Molecular Weight (Mp) 376 to 9,290,000, were used to generate the calibration curve. The average molecular weight and the polydispersity index were determined according to ISO 16014.

For the Dynamic Oscillatory Rate Sweep (DORS) test a sample in the form of a compression molded disk is loaded between a parallel plate-to-plate geometry. The measurements were performed at T=210° C. in a frequency range between 0.1 and 400 rad/s. The Polydispersity Index (PI) is calculated from the crossover modulus as follows: PI=$10^5$ Pa/$G_c$, where $G_c$=dynamic storage modulus (G')=dynamic loss modulus (G") at the crossover frequency.

Activity of the Catalytic Components Based Upon Polymerization Testing

Tables 2 and 3 summarize the bulk and gas phase polymerization results, respectively, that were obtained with the catalytic components of the present invention described above. The usage of silane C as external electron donor compound (ED) is indicated in column 3. The comparative examples are found at the bottom of the tables.

TABLE 2

BULK PHASE POLYMERIZATION RESULTS

| Example | Catalytic Component | ED | Activity [KgPP/ g-cat.] | MFR/ [g/10 min] | XS/ [wt. %] | PI (DORS) |
|---|---|---|---|---|---|---|
| 1 | 1 | — | 35.3 | 87.3 | 1.7 | 4.3 |
| 2 | 2 | — | 28.3 | 105.6 | 5.0 | 4.1 |
| 3 | 3 | — | 36.7 | 120.6 | 2.5 | 4.2 |
| 4 | 4 | — | 32.0 | 168.4 | 9.3 | 4.4 |
| Comp. 1 | Comp. catalyst A | C | 22.6 | 14.0 | 1.6 | 4.2 |

TABLE 3

GAS PHASE POLYMERIZATION RESULTS

| Example | Catalytic Component | ED | Activity [KgPP/ g-cat.] | MFR/ [g/10 min] | XS/ [wt. %] | PI (DORS) |
|---|---|---|---|---|---|---|
| 5 | 1 | — | 21.4 | 18.5 | 1.5 | 3.9 |
| 6 | 1 | C | 12.9 | 19.1 | 1.1 | 4.0 |
| 7 | 2 | — | 18.2 | 20.3 | 4.7 | 4.2 |
| 8 | 3 | — | 24.5 | 17.7 | 2.1 | 4.0 |
| 9 | 4 | — | 24.0 | 20.3 | 8.3 | 3.7 |
| 10 | 4 | C | 15.6 | 18.6 | 4.5 | 4.0 |
| Comp. 2 | Comp. catalyst A | — | 4.7 | 91.0 | 34.1 | 4.0 |
| Comp. 3 | Comp. catalyst A | C | 16.8 | 4.7 | 1.1 | 3.9 |
| Comp. 4 | Comp. catalyst B | C | 14.4 | 8.5 | 1.7 | 3.8 |

The results in Table 2 and 3 clearly show that the exemplary diether-based catalytic components of the present invention exhibited significantly higher activity and stereo selectivity without silane as external electron donor compound in the polymerization process than the comparative catalysts A, while the polydispersity index (PI) is unexpectedly comparable for all catalysts.

A high stereo selectivity with a catalyst containing phthalate, e.g. comparative catalysts A can be obtained only in the presence of an external electron donor compound. Simultaneously with the decrease of the XS value the activity increases significantly (Comp. example 2 vs. 3). Compared to the phthalate-based catalyst and silane system, catalysts containing a diether component as internal donor show a higher activity over a broad XS range with an excellent hydrogen response, see Table 2 and 3. For example under bulk polymerization condition catalytic component 1 shows an activity of 35.3 kg/gcat without any stereo modifier and comparative catalyst A shows an activity of 22.6 kg/gcat in the presence of a silane, while the XS and PI values of both homo polymers are comparable (see Example 1 and Comp. example 1).

The stereo selectivity of catalysts of this invention can be adjusted by various synthesis parameters. One is the amount of diether component as internal donor used for the synthesis, exemplary shown with catalytic components 3 and 4 (see Example 3 and 4 or 8 and 9). Here, with higher ID/Mg ratio during the synthesis, the stereo selectivity increases, resulting in lower XS value in the polymer, see Table 2 and 3.

In contrast to the comparative catalysts A and B in the presence of a silane the activities of the diether-based catalyst decrease (e.g. Example 5 vs. Example 6). Surprisingly, the presence of silane does not influence the polydispersity index of the resulting polymer, which is not expected by one of ordinary skill in the art. On the contrary, it would be expected that the PI decreases in the following order: catalyst system containing a phthalate component and silane >catalyst containing a diether component >catalyst system containing a diether component and silane (Polypropylene Handbook, $2^{nd}$ Edition, Editor: Nello Pasquini, Carl Hanser Verlag, Munich, 2005, page 18, Table 2.1 and P. Galli, G. Vecellio, Journal of Polymer Science: Part A: Polymer Chemistry, Vol. 42, 396-415 (2004), pages 404-405 and Table 1)

Independent of the polymerization condition, e.g. bulk or gas phase polymerization or with and without a silane, the polydispersity index of PP produced with diether-based catalysts synthesized in accordance to the present invention is comparable to PP produced with a comparative catalyst containing phthalate, see table 2 and 3. The average PI obtained with DORS of all inventive examples where diether components are used as internal donor (Examples 1 to 9) is 4.1, which matches the average PI (4.0) of the comparative examples where phthalates are used as internal donor (Comp. examples 1 to 4).

Additionally to dynamic shear test (DORS) the polydispersity index was determined with GPC. Table 4 summarizes these PIs obtained with both methods.

TABLE 4

MOLECULAR WEIGHT DISTRIBUTION

| Example | Catalytic Component | MFR [g/10 min] | PI (DORS) | PI (GPC) |
|---|---|---|---|---|
| 2 | 2 | 105.6 | 4.1 | 7.3 |
| 5 | 1 | 18.5 | 3.9 | 7.4 |
| 6 | 1 | 19.1 | 4.0 | 7.0 |
| 9 | 4 | 20.3 | 3.7 | 6.6 |
| Comp. 3 | Comp. catalyst A | 4.7 | 3.9 | 7.0 |
| Comp. 4 | Comp. catalyst B | 8.5 | 3.8 | 6.8 |

For both methods the polydispersity index can be obtained. Table 4 shows that the PI determined by DORS is lower than by GPC, which is well known in the art.

The obtained PI (GPC) values of the comparative catalyst systems containing phthalate are in the expected range. Quite contrary to the expectation and to the consent in the literature, the PI (GPC) values of polypropylene obtained with diether-based catalyst systems produced according to the present invention are in the same range as PP obtained with phthalate-based catalyst systems (Comp. Examples 3 and 4 vs. Examples 2, 5, 6 and 9). One of ordinary skill in the art, would expect values of between 5 to 5.5 for the diether-based catalyst systems, while values of between 6.5 to 8 for phthalate-based catalyst systems are expected (Polypropylene Handbook, $2^{nd}$ Edition, Editor: Nello Pasquini, Carl Hanser Verlag, Munich, 2005, page 18, Table 2.1 and P. Galli, G. Vecellio, Journal of Polymer Science: Part A: Polymer Chemistry, Vol. 42, 396-415 (2004), pages 404-405 and Table 1).

The polydisperisty index determined with DORS and/or GPC lead to the same conclusion that the PIs of polymers obtained using catalysts containing a diether component produced according to the present invention and non-inventive phthalate-based catalysts are comparable, while all catalysts give a polydispersity index PI (GPC) of >=5.75.

As described above, embodiments disclosed herein provide for unique Ziegler-Natta catalysts using diethers as an internal electron donor. Advantageously, embodiments disclosed herein may provide for improved catalytic systems of the Ziegler-Natta type with an excellent hydrogen response and stereoselectivity while the molecular weight distribution is comparable to phthalate containing Ziegler-Natta catalysts. In addition, the catalyst has a high activity and allows the production of polymers of α-alk-1-enes having a good morphology and bulk density.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A supported Ziegler-Natta catalyst system comprising a support, titanium, magnesium, and a diether compound as the only internal electron donor and having an activity and hydrogen response suitable for the production of propylene polymers having a molecular weight distribution (PI(GPC)) in the range from about 5.75 to about 9, wherein the support consists of oxides of silicon, aluminum, titanium, zirconium, metals from Groups I or II of the Periodic Table, or mixtures or chemical combinations of these oxides, and wherein the support has a mean particle diameter in the range from about 15 to about 200 microns.

2. The catalyst system of claim 1, wherein the diether compound has the general structure (I):

$$R^1O—(C\ R^5R^6)_n—CR^3R^4—(C\ R^7R^8)_m—OR^2 \quad (I)$$

where $R^1$ and $R^2$ are the same or different and are selected from the group consisting of a saturated or unsaturated aliphatic group of from 1 to about 20 carbon atoms or an aryl group of from 6 to about 20 carbon atoms, n+m=2 to 4, $R^3$, $R^4$, $R^5$, $R^6$, $R^7$ and $R^8$ are identical or different and are each a hydrogen atom, a linear, cyclic or branched hydrocarbon group, and optionally contain one or more hetero atoms and/or halogen atoms, and/or the two radicals $R^3$ and $R^4$ may form a hydrocarbon ring system, and $R^3$ and/or $R^4$ are different from hydrogen.

3. The catalyst system of claim 1, wherein the diether compound has the general structure (II):

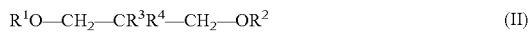

$$R^1O—CH_2—CR^3R^4—CH_2—OR^2 \quad (II)$$

where $R^1$ and $R^2$ are the same or different and are selected from the group consisting of a saturated or unsaturated aliphatic group of from 1 to about 20 carbon atoms, $R^3$ and $R^4$ are identical or different and are each a linear, cyclic or branched hydrocarbon group, and optionally contain one or more hetero atoms and/or halogen atoms, and/or the two radicals $R^3$ and $R^4$ may form a hydrocarbon ring system.

4. The catalyst system of claim 1, wherein the diether compound has the general structure (II):

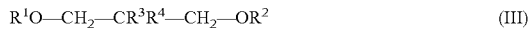

$$R^1O—CH_2—CR^3R^4—CH_2—OR^2 \quad (III)$$

where $R^1$ and $R^2$ are identical and are selected from the group consisting of an alkyl group of from 1 to about 10 carbon atoms, $R^3$ and $R^4$ are identical or different and are each a linear, cyclic or branched hydrocarbon group, and/or the two radicals $R^3$ and $R^4$ may form a hydrocarbon ring system optionally containing one or more hetero atoms.

5. The catalyst system of claim 1, wherein the diether compound comprises at least one of 2,2 di-cyclopentyl-1,3-dimethoxypropane; 2,2 di-(cyclopentylmethyl)-1,3-dimethoxypropane; 2,2-di-cylohexyl-1,3-dimethoxypropane; 2,2-di-(cylohexylmethyl)-1,3-dimethoxypropane; 2,2-di-norbornyl-1,3-dimethoxypropane; 2,2-di-phenyl-1,3-dimethoxypropane; 2,2-di-phenylmethyl-1,3-dimethoxypropane; 2,2-di-n-propyl-1,3-dimethoxypropane; 2,2-di-isopropyl-1,3-dimethoxypropane; 2,2-di-n-butyl-1,3-dimethoxypropane; 2,2-di-secbutyl-1,3-dimethoxypropane; 2,2-di-isobutyl-1,3-dimethoxypropane; 2,2-di-n-pentyl-1,3-dimethoxypropane; 2,2-di-(2-pentyl)-1,3-dimethoxypropane; 2,2-di-(3-pentyl)-1,3-dimethoxypropane; 2,2-di-(methylbutyl)-1,3-dimethoxypropane; 2,2-di-(3-methylbut-2-yl)-1,3-dimethoxypropane; 2,2-di-isopentyl-1,3-dimethoxypropane; 2,2-di-n-hexyl-1,3-dimethoxypropane; 2,2-di-2-hexyl-1,3-dimethoxypropane; 2,2-di-3-hexyl-1,3-dimethoxypropane; 2,2-di-(2-methylpentyl)-1,3-dimethoxypropane; 2,2-di-(3-methylpentyl)-1,3-dimethoxypropane; 2,2-di-(4-methylpentyl)-1,3-dimethoxypropane; 2-tertbutyl-1,3-dimethoxypropane; 2-ethyl-2-tertbutyl-1,3-dimethoxypropane; 2-n-propyl-2-tertbutyl-1,3-dimethoxypropane; 2-n-butyl-2-tertbutyl-1,3-dimethoxypropane; 2-isobutyl-2-tertbutyl-1,3-dimethoxypropane; 2-n-pentyl-2-tertbutyl-1,3-dimethoxypropane; 2-isopentyl-2-tertbutyl-1,3-dimethoxypropane; 2-n-hexyl-2-tertbutyl-1,3-dimethoxypropane; 2-ethyl-2-isopropyl-1,3-dimethoxypropane; 2-n-propyl-2-isopropyl-1,3-dimethoxypropane; 2-n-butyl-2-isopropyl-1,3-dimethoxypropane; 2-secbutyl-2-isopropyl-1,3-dimethoxypropane; 2-isobutyl-2-isopropyl-1,3-dimethoxypropane; 2-n-pentyl-2-isopropyl-1,3-dimethoxypropane; 2-(2-pentyl)-2-isopropyl-1,3-dimethoxypropane; 2-(3-pentyl)-2-isopropyl-1,3-dimethoxypropane; 2-methylbutyl-2-isopropyl-1,3-dimethoxypropane; 2-(3-methylbut-2-yl)-2-isopropyl-1,3-dimethoxypropane; 2-isopentyl-2-isopropyl-1,3-dimethoxypropane; 2-n-hexyl-2-isopropyl-1,3-dimethoxypropane; 2-(2-hexyl)-2-isopropyl-1,3-dimethoxypropane; 2-(3-hexyl)-2-isopropyl-1,3-dimethoxypropane; 2-(2-methylpentyl)-2-isopropyl-1,3-dimethoxypropane; 2-(3-methylpentyl)-2-isopropyl-1,3-dimethoxypropane; 2-(4-methylpentyl)-2-isopropyl-1,3-dimethoxypropane; 2-ethyl-2-cyclopentyl-1,3-dimethoxypropane; 2-n-propyl-2-cyclopentyl-1,3-dimethoxypropane; 2-isopropyl-2-cyclopentyl-1,3-dimethoxypropane; 2-n-butyl-2-cyclopentyl-1,3-dimethoxypropane; 2-isobutyl-2-cyclopentyl-1,3-dimethoxypropane; 2-secbutyl-2-cyclopentyl-1,3-dimethoxypropane; 2-n-pentyl-2-cyclopentyl-1,3-dimethoxypropane; 2-(2-pentyl)-2-cyclopentyl-1,3-dimethoxypropane; 2-(3-pentyl)-2-cyclopentyl-1,3-dimethoxypropane; 2-methylbutyl-2-cyclopentyl-1,3-dimethoxypropane; 2-(3-methylbut-2-yl)-2-cyclopentyl-1,3-dimethoxypropane; 2-ethyl-2-cyclohexyl-1,3-dimethoxypropane; 2-n-propyl-2-cyclohexyl-1,3-dimethoxypropane; 2-isopropyl-2-cyclohexyl-1,3-dimethoxypropane; 2-n-butyl-2-cyclohexyl-1,3-dimethoxypropane; 2-isobutyl-2-cyclohexyl-1,3-dimethoxypropane; 2-secbutyl-2-cyclohexyl-1,3-dimethoxypropane; 2-n-pentyl-2-cyclohexyl-1,3-dimethoxypropane; 2-(2-pentyl)-2-cyclohexyl-1,3-dimethoxypropane; 2-(3-pentyl)-2-cyclohexyl-1,3-dimethoxypropane; 2-methylbutyl-2-cyclohexyl-1,3-dimethoxypropane; 2-(3-methylbut-2-yl)-2-cyclohexyl-1,3-dimethoxypropane; and the corresponding 1,3-diethoxypropane analogues.

6. The catalyst system of claim 1, wherein the diether compound comprises at least one of 9,9-bis(methoxymethyl) fluorene; 9,9-bis(methoxymethyl)-2,3,6,7-tetramethylfluorene; 9,9-bis(methoxymethyl)-2,7-dimethylfluorene; 9,9-bis(methoxymethyl)-2,7-diisoproylfluorene; 9,9-bis(methoxymethyl)-2,7-ditertbutylfluorene; 9,9-bis(methoxymethyl)-2,8-dimethylfluorene; 9,9-bis(methoxymethyl)-3,6-dimethylfluorene; 9,9-bis(methoxymethyl)-3,6-ditertbutylfluorene; 9,9-bis(methoxymethyl)-3,6-diisopropylfluorene; 9,9-bis(methoxymethyl)-4,5-dimethylfluorene; 9,9-bis(methoxymethyl)-2-methylfluorene; 9,9-bis(methoxymethyl)-4-methylfluorene; 9,10-dihydro-9,9-dimethoxyanthracene; 9,10-dihydro-9,9-diethoxyanthracene; 9,9-Dimethoxyxanthene; 9,9-Diethoxyxanthene; and the corresponding 9,9-bis(ethoxymethyl)-analogues.

7. The catalyst system of claim 1, wherein the diether compound comprises at least one of 2,2-di-isobutyl-1,3-dimethoxypropane; 2,2-di-isopropyl-1,3-dimethoxypropane; 2,2-di-cyclopentyl-1,3-dimethoxypropane; 2-isopropyl-2-isopentyl-1,3-dimethoxypropane; 2-isopropyl-2-isobutyl-1,3-dimethoxypropane; 2-isopropyl-2-cyclopentyl-dimethoxypropane; 2-ethyl-2-tert-butyl-1,3-dimethoxypropane or the corresponding 1,3-diethoxypropane analogues or 9,9-bis(methoxymethyl)fluorene or 9,9-bis(ethoxymethyl)fluorene.

8. The catalyst system of claim 1, wherein the diether compound is used in an amount of from about 0.01 to about 2 mole for each mole of the magnesium.

9. A process for the polymerization of olefins, comprising contacting olefins of formula CH2=CHR$^1$, in which R$^1$ is hydrogen or a hydrocarbon radical having 1-12 carbon atoms, with a catalyst according to claim 1 under polymerization conditions.

10. A supported Ziegler-Natta catalyst system comprising a support, titanium, magnesium, and a mixture of diether compounds as the only internal electron donors and having an activity and hydrogen response suitable for the production of propylene polymers having a molecular weight distribution (PI(GPC)) in the range from about 5.75 to about 9, wherein the support consists of oxides of silicon, aluminum, titanium, zirconium, metals from Groups I or II of the Periodic Table, or mixtures or chemical combinations of these oxides a wherein the support has a mean particle diameter in the range from about 15 to about 200 microns.

11. The catalyst system of claim 10, wherein the diether compounds have the general structure (I):

$$R^1O-(C\ R^5R^6)_n-CR^3R^4-(C\ R^7R^8)_m-OR^2 \quad (I)$$

where

R$^1$ and R$^2$ are the same or different and are selected from the group consisting of a saturated or unsaturated aliphatic group of from 1 to about 20 carbon atoms or an aryl group of from 6 to about 20 carbon atoms, n+m=2 to 4, R$^3$, R$^4$, R$^5$, R$^6$, R$^7$ and R$^8$ are identical or different and are each a hydrogen atom, a linear, cyclic or branched hydrocarbon group optionally containing one or more hetero atoms and/or halogen atoms, and/or the two radicals R$^3$ and R$^4$ may form a hydrocarbon ring system, and R$^3$ and/or R$^4$ are different from hydrogen.

12. The catalyst system of claim 10, wherein the diether compound has the general structure (II):

$$R^1O-CH_2-CR^3R^4-CH_2-OR^2 \quad (II)$$

where

R$^1$ and R$^2$ are the same or different and are selected from the group consisting of a saturated or unsaturated aliphatic group of from 1 to about 20 carbon atoms, R$^3$ and R$^4$ are identical or different and are each a linear, cyclic or branched hydrocarbon group optionally containing one or more hetero atoms and/or halogen atoms, and/or the two radicals R$^3$ and R$^4$ may form a hydrocarbon ring system.

13. The catalyst system of claim 10, wherein the diether compound has the general structure (III):

$$R^1O-CH_2-CR^3R^4-CH_2-OR^2 \quad (III)$$

where

R$^1$ and R$^2$ are identical and are selected from the group consisting of an alkyl group of from 1 to about 10 carbon atoms, R$^3$ and R$^4$ are identical or different and are each a linear, cyclic or branched hydrocarbon group, and/or the two radicals R$^3$ and R$^4$ may form a hydrocarbon ring system optionally containing one or more hetero atoms.

14. The catalyst system of claim 10, wherein the diether compound comprises at least one of 2,2 di-cyclopentyl-1,3-dimethoxypropane; 2,2 di-(cyclopentylmethyl)-1,3-dimethoxypropane; 2,2-di-cylohexyl-1,3-dimethoxypropane; 2,2-di-(cylohexylmethyl)-1,3-dimethoxypropane; 2,2-di-norbornyl-1,3-dimethoxypropane; 2,2-di-phenyl-1,3-dimethoxypropane; 2,2-di-phenylmethyl-1,3-dimethoxypropane; 2,2-di-n-propyl-1,3-dimethoxypropane; 2,2-di-isopropyl-1,3-dimethoxypropane; 2,2-di-n-butyl-1,3-dimethoxypropane; 2,2-di-secbutyl-1,3-dimethoxypropane; 2,2-di-isobutyl-1,3-dimethoxypropane; 2,2-di-n-pentyl-1,3-dimethoxypropane; 2,2-di-(2-pentyl)-1,3-dimethoxypropane; 2,2-di-(3-pentyl)-1,3-dimethoxypropane; 2,2-di-(methylbutyl)-1,3-dimethoxypropane; 2,2-di-(3-methylbut-2-yl)-1,3-dimethoxypropane; 2,2-di-isopentyl-1,3-dimethoxypropane; 2,2-di-n-hexyl-1,3-dimethoxypropane; 2,2-di-2-hexyl-1,3-dimethoxypropane; 2,2-di-3-hexyl-1,3-dimethoxypropane; 2,2-di-(2-methylpentyl)-1,3-dimethoxypropane; 2,2-di-(3-methylpentyl)-1,3-dimethoxypropane; 2,2-di-(4-methylpentyl)-1,3-dimethoxypropane; 2-tertbutyl-1,3-dimethoxypropane; 2-ethyl-2-tertbutyl-1,3-dimethoxypropane; 2-n-propyl-2-tertbutyl-1,3-dimethoxypropane; 2-n-butyl-2-tertbutyl-1,3-dimethoxypropane; 2-isobutyl-2-tertbutyl-1,3-dimethoxypropane; 2-n-pentyl-2-tertbutyl-1,3-dimethoxypropane; 2-isopentyl-2-tertbutyl-1,3-dimethoxypropane; 2-n-hexyl-2-tertbutyl-1,3-dimethoxypropane; 2-ethyl-2-isopropyl-1,3-dimethoxypropane; 2-n-propyl-2-isopropyl-1,3-dimethoxypropane; 2-n-butyl-2-isopropyl-1,3-dimethoxypropane; 2-secbutyl-2-isopropyl-1,3-dimethoxypropane; 2-isobutyl-2-isopropyl-1,3-dimethoxypropane; 2-n-pentyl-2-isopropyl-1,3-dimethoxypropane; 2-(2-pentyl)-2-isopropyl-1,3-dimethoxypropane; 2-(3-pentyl)-2-isopropyl-1,3-dimethoxypropane; 2-methylbutyl-2-isopropyl-1,3-dimethoxypropane; 2-(3-methylbut-2-yl)-2-isopropyl-1,3-dimethoxypropane; 2-isopentyl-2-isopropyl-1,3-dimethoxypropane; 2-n-hexyl-2-isopropyl-1,3-dimethoxypropane; 2-(2-hexyl)-2-isopropyl-1,3-dimethoxypropane; 2-(3-hexyl)-2-isopropyl-1,3-dimethoxypropane; 2-(2-methylpentyl)-2-isopropyl-1,3-dimethoxypropane; 2-(3-methylpentyl)-2-isopropyl-1,3-dimethoxypropane; 2-(4-methylpentyl)-2-isopropyl-1,3-dimethoxypropane; 2-ethyl-2-cyclopentyl-1,3-dimethoxypropane; 2-n-propyl-2-cyclopentyl-1,3-dimethoxypropane; 2-isopropyl-2-cyclopentyl-1,3-dimethoxypropane; 2-n-butyl-2-cyclopentyl-1,3-dimethoxypropane; 2-isobutyl-2-cyclopentyl-1,3-dimethoxypropane; 2-secbutyl-2-cyclopentyl-1,3-dimethoxypropane; 2-n-pentyl-2-cyclopentyl-1,3- dimethoxypropane; 2-(2-pentyl)-2-cyclopentyl-1,3-dimethoxypropane; 2-(3-pentyl)-2-cyclopentyl-1,3-dimethoxypropane; 2-methylbutyl-2-cyclopentyl-1,3-dimethoxypropane; 2-(3-methylbut-2-yl)-2-cyclopentyl-1,3-dimethoxypropane; 2-ethyl-2-cyclohexyl-1,3-dimethoxypropane; 2-n-propyl-2-cyclohexyl-1,3-dimethoxypropane; 2-isopropyl-2-cyclohexyl-1,3-dimethoxypropane; 2-n-butyl-2-cyclohexyl-1,3-dimethoxypropane; 2-isobutyl-2-cyclohexyl-1,3-dimethoxypropane; 2-secbutyl-2-cyclohexyl-1,3-dimethoxypropane; 2-n-pentyl-2-cyclohexyl-1,3-dimethoxypropane; 2-(2-pentyl)-2-cyclohexyl-1,3-dimethoxypropane; 2-(3-pentyl)-2-cyclohexyl-1,3-dimethoxypropane; 2-methylbutyl-2-cyclohexyl-1,3-dimethoxypropane; 2-(3-methylbut-2-yl)-2-cyclohexyl-1,3-dimethoxypropane; and the corresponding 1,3-diethoxypropane analogues.

15. The catalyst system of claim 10, wherein the diether compound comprises at least one of 9,9-bis(methoxymethyl)fluorene; 9,9-bis(methoxymethyl)-2,3,6,7-tetramethylfluorene; 9,9-bis(methoxymethyl)-2,7-dimethylfluorene; 9,9-bis(methoxymethyl)-2,7-diisoproylfluorene; 9,9-bis(methoxymethyl)-2,7-ditertbutylfluorene; 9,9-bis(methoxymethyl)-2,8-dimethylfluorene; 9,9-bis(methoxymethyl)-3,6-dimethylfluorene; 9,9-bis(methoxymethyl)-3,6-ditertbutylfluorene; 9,9-bis(methoxymethyl)-3,6-diisopropylfluorene; 9,9-bis(methoxymethyl)-4,5-dimethylfluorene; 9,9-bis(methoxymethyl)-2-methylfluorene; 9,9-bis(methoxymethyl)-4-methylfluorene; 9,10-dihydro-9,9-dimethoxyanthracene; 9,10-dihydro-9,9-diethoxyanthracene; 9,9-Dimethoxyxanthene; 9,9-Diethoxyxanthene; and the corresponding 9,9-bis(ethoxymethyl)-analogues.

16. The catalyst system of claim 10, wherein the diether compound comprises at least one of 2,2-di-isobutyl-1,3-dimethoxypropane; 2,2-di-isopropyl-1,3-dimethoxypropane; 2,2-di-cyclopentyl-1,3-dimethoxypropane; 2-isopropyl-2-isopentyl-1,3-dimethoxypropane; 2-isopropyl-2-isobutyl-1,3-dimethoxypropane; 2-isopropyl-2-cyclopentyl-dimethoxypropane; 2-ethyl-2-tert-butyl-1,3-dimethoxypropane or the corresponding 1,3-diethoxypropane analogues or 9,9-bis(methoxymethyl)fluorene or 9,9-bis(ethoxymethyl)fluorene.

17. The catalyst system of claim 10, wherein the diether compound is used in an amount of from about 0.01 to about 2 mole for each mole of the magnesium.

18. A process for the polymerization of olefins, comprising contacting olefins of formula $CH_2=CHR^1$, in which $R^1$ is hydrogen or a hydrocarbon radical having 1-12 carbon atoms, with a catalyst according to claim 10 under polymerization conditions.

* * * * *